United States Patent
Seifi et al.

(10) Patent No.: US 10,491,792 B2
(45) Date of Patent: Nov. 26, 2019

(54) HYBRID PLENOPTIC CAMERA

(71) Applicant: INTERDIGITAL CE PATENT HOLDINGS, Paris (FR)

(72) Inventors: Mozhdeh Seifi, Thorigne-Fouillard (FR); Nues Sabater, Betton (FR); Valter Drazic, Betton (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/317,160

(22) PCT Filed: Jun. 9, 2015

(86) PCT No.: PCT/EP2015/062841
§ 371 (c)(1),
(2) Date: Dec. 8, 2016

(87) PCT Pub. No.: WO2015/189211
PCT Pub. Date: Dec. 17, 2015

(65) Prior Publication Data
US 2017/0118387 A1 Apr. 27, 2017

(30) Foreign Application Priority Data
Jun. 10, 2014 (EP) .................................... 14305870

(51) Int. Cl.
*H04N 5/225* (2006.01)
*H04N 5/04* (2006.01)
(Continued)

(52) U.S. Cl.
CPC ......... *H04N 5/2259* (2013.01); *G02B 3/0006* (2013.01); *G02B 7/023* (2013.01);
(Continued)

(58) Field of Classification Search
CPC .... H04N 5/2259; H04N 5/2254; H04N 5/238; H04N 5/349; H04N 5/2253; G06T 3/4015; G06T 7/557; G02B 27/0075; G02B 7/023
See application file for complete search history.

(56) References Cited

U.S. PATENT DOCUMENTS

| 8,189,089 B1 | 5/2012 | Georviev et al. |
| 2005/0151861 A1 | 7/2005 | Bornstein et al. |

(Continued)

FOREIGN PATENT DOCUMENTS

| CN | 203219391 | 9/2013 |
| WO | WO2007092545 | 8/2007 |

OTHER PUBLICATIONS

Oberdorster et al., "Adaptive DOF for Plenoptic Cameras", Multimedia Content and Mobile Devices, Proceedings of the SPIE—The International Society for Optical Engineering, vol. 8667, Mar. 7, 2013, pp. 1-12.
(Continued)

*Primary Examiner* — Ahmed A Berhan
(74) *Attorney, Agent, or Firm* — Jeffrey M. Navon

(57) ABSTRACT

A plenoptic camera has a moveable micro-lens array in optical registration with an image sensor. A first prime mover displaces the micro-lens array synchronized with a frame rate for the camera to obtain multi-resolution of a scene. A second prime mover displaces the image sensor to increase color sampling.

14 Claims, 3 Drawing Sheets

(51) Int. Cl.
  *G02B 7/02*  (2006.01)
  *G02B 3/00*  (2006.01)
  *G06T 3/40*  (2006.01)
  *H04N 5/349* (2011.01)

(52) U.S. Cl.
  CPC ............. *G06T 3/4015* (2013.01); *H04N 5/04* (2013.01); *H04N 5/2253* (2013.01); *H04N 5/2254* (2013.01)

(56) References Cited

U.S. PATENT DOCUMENTS

| | | | |
|---|---|---|---|
| 2008/0165270 A1* | 7/2008 | Watanabe | G03B 17/58 348/340 |
| 2011/0149126 A1 | 6/2011 | Mitsui et al. | |
| 2013/0057749 A1* | 3/2013 | Hiasa | H04N 5/238 348/340 |
| 2013/0208082 A1 | 8/2013 | Williams et al. | |
| 2013/0321581 A1 | 12/2013 | El-Ghoroury et al. | |
| 2014/0146201 A1* | 5/2014 | Knight | H04N 9/04 348/231.99 |

OTHER PUBLICATIONS

Perwass et al., "Single Lens 3D-Camera with Extended Depth-of-Field", Proceedings SPIE, vol. 8291, Human Vision and Electronic Imaging XVII, Feb. 18, 2012, pp. 1-15.
Ben-Ezra et al., "Video Super-Resolution Using Controlled Subpixel Detector Shifts", IEEE Transactions on Pattern Analysis and Machine Intelligence, vol. 27, No. 6, Jun. 2005, pp. 977-987.
ISR for International Application No. PCT/EP2015/062841, dated Aug. 13, 2015, pp. 1-5.

\* cited by examiner

Simple visualization of the image formation by a plenoptic camera

HYBRID PLENOPTIC CAMERA

CROSS REFERENCES

This application claims the benefit, under 35 U.S.C. § 365 of International Application PCT/EP2015/062841, filed Jun. 9, 2015, which was published in accordance with PCT Article 21(2) on Dec. 17, 2015, in English, and which claims the benefit of European Application, Serial No. 14305870.9, filed on Jun. 10, 2014, which is herein incorporated by reference in its entirety.

TECHNICAL FIELD

This invention relates to a plenoptic camera.

BACKGROUND ART

A plenoptic camera, sometimes referred to as a light-field camera, typically includes an array of micro-lenses located proximate the focal plane of the camera. This feature of the plenoptic camera allows it to capture the light field of a scene. With the aid of a computer, a user can post-process the light field captured by the plenoptic camera to reconstruct images of the scene from different points of view. Further, the user can also change the focus point of the images captured by the plenoptic camera.

Compared to a conventional camera, the plenoptic camera includes extra optical components, (i.e., the micro-lens array), which enables the camera to achieve the goals mentioned above. There presently exist at least two different types of plenoptic cameras. A first type of plenoptic camera, as exemplified by the plenoptic camera manufactured by Lytro, Inc., Mountain View, Calif. USA, has its array or micro-lenses located one focal length from the camera image sensor. All the micro-lenses in the array have the same focal length. This micro-lens configuration affords a maximum angular resolution but a low spatial resolution. The second type of plenoptic camera, as exemplified by the plenoptic camera manufactured by Raytrix GmbH, Kiel, Germany, has a micro-lens array with three types of micro-lenses. This type of plenoptic camera is characterized by the fact that the image of the main lens does not form onto the micro-lenses, but onto a surface in the air. This surface is then set as the object, which is then imaged on the sensor by the micro-lens array. The three different types of micro-lenses provide a bigger depth of field as compared to a micro-lens array having the same kind of micro-lenses. This type of plenoptic camera sacrifices angular resolution for better spatial resolution because the micro-lenses are focused on the main image, getting more spatial resolution, and less angular resolution.

Many present-day plenoptic cameras choose to array micro-lenses in the array in hexagonal arrangement, although a Cartesian grid could also work. A Bayer-pattern color filter filters light incident on the individual light-sensing elements of the camera image sensor, thereby enabling the camera image sensor to capture color information in a roughly sampled image. This sampled image contains small sub-images formed under each micro-lens. The sub-image formed under each micro-lens actually becomes the sampled image of the exit pupil of the main camera lens seen by that micro-lens. This sub-image contains angular information of the light field. Concatenating the pixels taken from a fixed position under each micro-lens (i.e., the same pixel position in the sub-images) yields an image of the captured scene from a certain viewpoint. Hereinafter, the term "view de-multiplexing" will refer to the process of extracting the pixels to form an image of the captured scene from the particular viewpoint.

With the Bayer color filter positioned in front of the camera image sensor, the resultant captured image can undergo de-mosaicking after de-multiplexing the views. Considering the fact that the pixels under each micro-lens contain the information from different positions of the scene, de-mosaicking of such images (the raw data) yields little useful information and suffers from view crosstalk. The hexagonal arrangement of the micro-lenses result in patterns that suffer from irregularity and severely monochromaticism, i.e., the color sampling of the scene suffers from big spatial gaps between the samples.

To perform the de-mosaicking of the de-multiplexed view, a processor will pre-process the captured image to obtain the information of three channels in every neighborhood of the view. This pre-processing includes calculating disparity maps that guide the de-mosaicking algorithm. In practice, however, the results of such preprocessing yield much lower quality than the de-mosaicking of the raw data.

Thus, a need exists for an improved plenoptic camera that does not suffer from at least one of the aforementioned disadvantages.

BRIEF SUMMARY

It is an object of the present invention to provide a plenoptic camera with high spatial and angular resolution.

It is another object of the present invention, to provide a plenoptic camera that reduces the need for pre-processing.

It is yet another object of the present invention to provide a plenoptic camera with improved color resolution.

These and other benefits are obtained by a plenoptic camera in accordance with an aspect of the present principles. The plenoptic camera of the present principles is characterized by a moveable micro-lens array in optical registration with an image sensor. A first prime mover that displaces the micro-lens array synchronized with a frame rate for the camera to obtain multi-resolution of a scene.

In accordance with another aspect of the present principles, a plenoptic camera is characterized by a moveable micro-lens array in optical registration with an image sensor. A first prime mover that displaces the micro-lens array synchronized with a frame rate for the camera to obtain multi-resolution of a scene. A second prime mover displaces the image sensor to increase color sampling.

BRIEF DESCRIPTION

Figure 1:
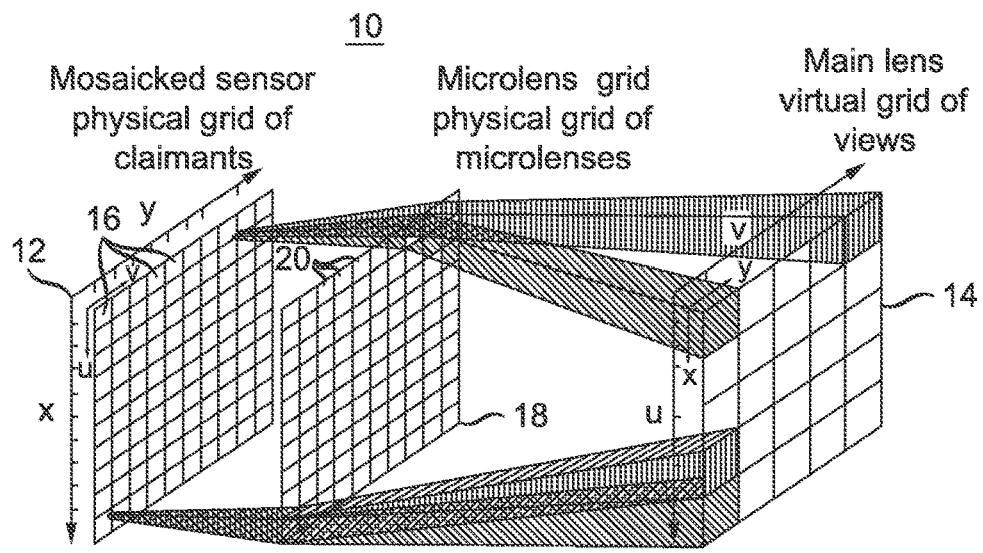
FIG. 1 depicts a simplified schematic view of prior-art plenoptic camera showing the manner in which the camera forms an image.

FIG. 1 depicts a simplified schematic view of prior-art plenoptic camera 10 comprised of an image sensor 12 in spaced relationship from a main lens 14. The image sensor 12 comprises a plurality of individual light sensing elements 16 arranged in an array of $n_1 \times n_2$ where $n_1$ and $n_2$ are integers. Each of the light sensing elements of the image sensor 12 captures the light associated with a corresponding pixel in the image at the focal point of the main lens 14.

Figure 2:
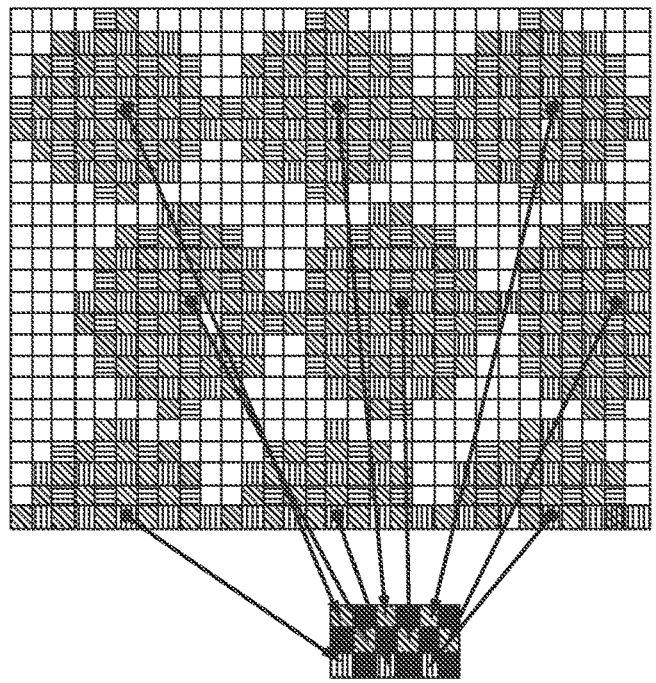
FIG. 2 depicts a color sampling of a scene captured by the plenoptic camera of FIG. 1 illustrating the hexagonal arrangement of micro-lenses in the plenoptic camera.
Figure 3:
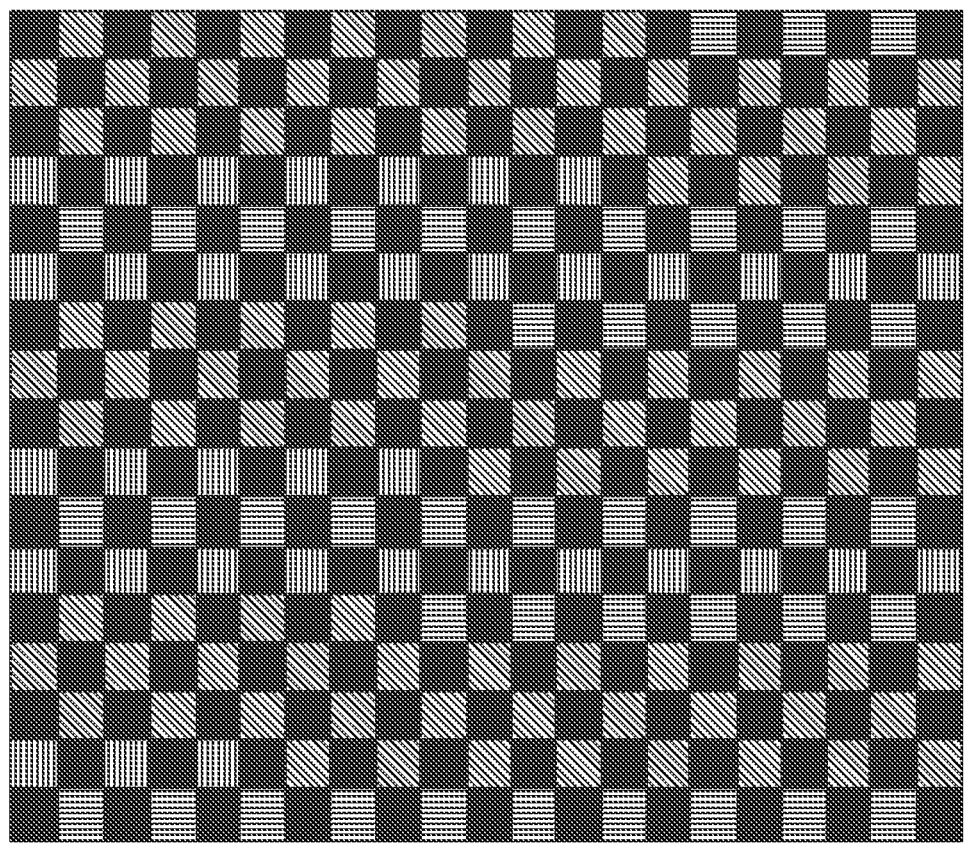
FIG. 3 depicts the image of FIG. 2 following—mosaicking of the pixels associated with one view.

The plenoptic camera 10 of FIG. 1 includes a micro-lens array 18 comprised of individual micro-lenses 20. The micro-lens array 18 lies in spaced between the image sensor 12 and the main lens 14. Depending on the nature of the plenoptic camera, the micro-lens array 18 will lie a focal length or longer from the image sensor 12. As discussed above, the micro-lenses 20 in the micro-lens array 18 have a hexagonal arrangement. A Bayer-pattern color filter (not shown) filters light incident on the individual light-sending elements of the camera image sensor, thereby enabling the image sensor 12 to capture color information in a roughly sampled image. This sampled image contains small sub-images formed under each micro-lens, as illustrated by FIG. 2. FIG. 3 depicts a pattern created by mosaicking the individual pixels of the sub-images of FIG. 2. With the Bayer color filter positioned in front of the image sensor 12, the resultant captured image can undergo de-mosaicking after de-multiplexing the views. As discussed, the hexagonal arrangement of the micro-lenses 20 in the micro-lens array 18 of FIG. 1 yields in Bayer patterns that suffer from irregularity and severely monochromaticism, i.e., the color sampling of the scene suffers from big spatial gaps between the samples as seen in FIG. 3.

Figure 4A:
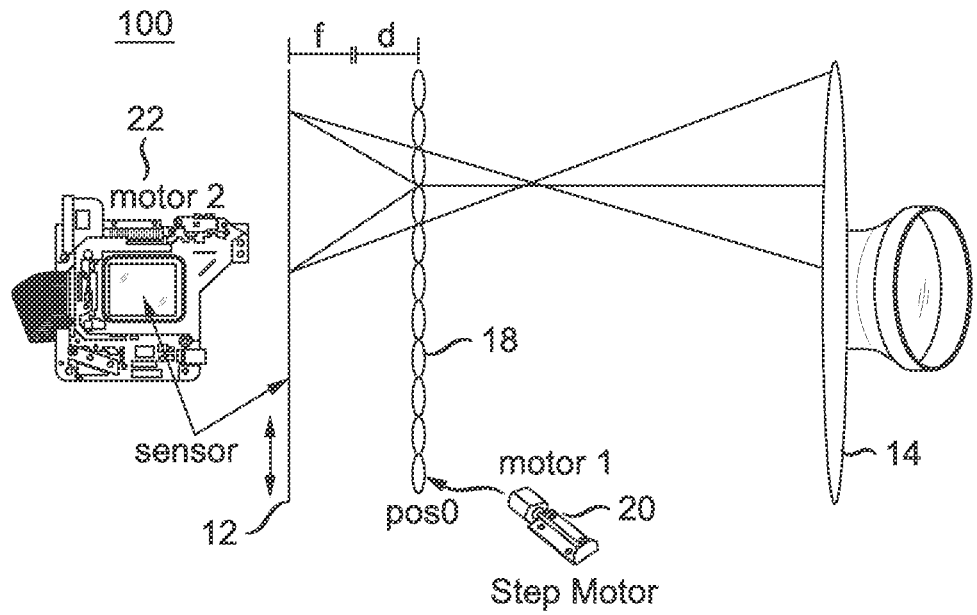
FIGS. 4A and 4B depict block schematic diagram of a plenoptic camera of the present principles showing different positions of the micro-lens array.
Figure 4B:
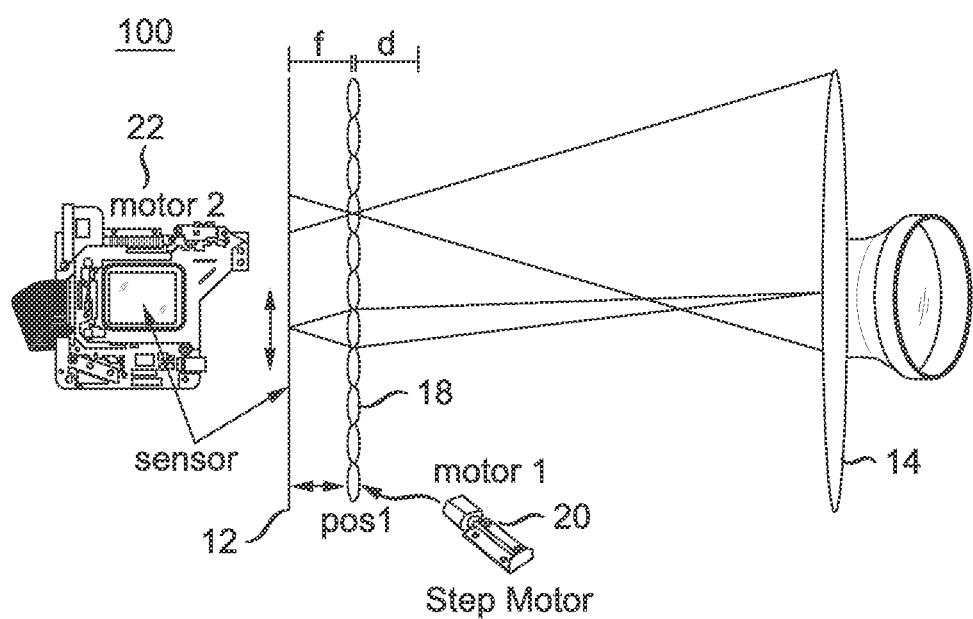

FIGS. 4A and 4B depict schematic views of a plenoptic camera 100 in accordance with a particular and non specific embodiment of the present principles, which overcomes at least one of the aforementioned disadvantages of prior-art plenoptic cameras. The plenoptic camera 100 of FIGS. 4A and 4B, like the plenoptic camera 10 of FIG. 1, comprises an image sensor 12, a main lens 14, and a micro-lens array 18 spaced between the image sensor and main lens. In contrast to the prior plenoptic camera 10, whose micro-lens array 18 lies at a fixed distance from the image sensor 12 (typically at a focal length or more depending on the type of plenoptic camera), in accordance with an aspect of the present principles, the plenoptic camera 100 of FIGS. 4A and 4B has a moveable micro-lens array 18.

The plenoptic camera 100 of the present principles includes a first prime mover 20 in the form of an electric motor that displaces the moveable the micro-lens 18 array in synchronism manner with the camera's frame rate to obtain a multi-(spatial/angular/chromatic) resolution pyramid of the scene. In practice, the electric motor 20 can displace the micro-lens array 18 from a starting position 0 (pos0), depicted in FIG. 4A which lies a distance f+d from the image sensor 12, where f represents the focal plane of the micro lenses in the array 18 with highest f-number, to a position 1 (pos1) a distance f from the image sensor 12, as seen in FIG. 4B. As can be appreciated, by moving the micro-lens array 18 from pos0 in FIG. 4A to pos1 in FIG. 4B, the motor 20 affords the camera 100 of the present principles the ability to switch from a second type of plenoptic camera ("type 2") to a first type of plenoptic camera ("type 1"). For a type 2 plenoptic camera having a frame rate of 56 fps, such as the Raytrix camera, the interval between successive frames equals 18 ms. Having the motor 20 move the micro-lens 18 during the period between frames assures substantially no image degradation due to motion blur.

To appreciate the operation of the plenoptic camera 100 of the present principles, consider the situation when the motor 20 moves the micro-lens array 18 of the plenoptic camera 100 in five increments between pos0 and pos1 of FIGS. 4A and 4B, respectively. The image sensor 12 will capture a stack of images with a frame rate of 11.2 fps. This stack of images has interesting properties. Knowing the amount of displacement yields a stack that presents a pyramid of images having increasing spatial resolution and decreasing angular resolution. This pyramid of multi-resolution images provides rich chromatic information of a scene thanks to the fixed Bayer pattern on the image sensor 12. The image captured at pos1 of the micro-lens array 18 as depicted in FIG. 4B (with the camera 100 corresponding to a "type 1" plenoptic camera), will typically lie at the top of this pyramid and will have the lowest spatial resolution and the highest angular resolution. The image of pos0 (the image of the state-of-art Raytrix camera configuration, that is a "type 2" plenoptic camera) will typically lie at the bottom of this pyramid and will have the highest spatial resolution and lowest angular resolution.

Configuring the plenoptic camera 100 of the present principles with a moveable micro-lens 18 displaced by the electric motor 20 advantageously yields a hybrid plenoptic camera. In other words, the moveable micro-lens array 18 allows the camera 100 of the present principles to act as a combination of a "type 1" and "type 2" plenoptic camera, thus the advantages of each type of the existing plenoptic cameras. The configuration of the plenoptic camera 100 maximizes angular resolution, spatial resolution, chromatic resolution, and depth of field. The images captured by the plenoptic camera 100 of the present principles can undergo processing using one or more of several well-known image-processing approaches (e.g., ray tracing, or multi-frame super resolution algorithms to obtain a high spatial and angular resolution light field.

In addition to the structure thus far described, the plenoptic camera 100 of the present principles includes a hardware configuration inspired by the human visual system to simplify further the ill-posed de-mosaicking problem of existing plenoptic cameras. In connection with the anatomy of the human eye, the fovea constitutes the only part of the eye that captures the color information. The Fovea contains randomly distributed cells, i.e., Long, Medium and Short wavelength cones that sample the color information, In other words, each cone captures light information of a certain wavelength at a certain spatial position on the fovea (which corresponds to a mosaicked image). The optical nerves transfer this information to the brain to obtain the color image of the scene. To improve the resolution of this captured information, even when a person stares at an object, the human eye undergoes a jiggling motion, which results in the tiny translations of the image on the retina, thus providing the color information of all the channels near-simultaneously to the brain.

To simulate the jiggling effect of the eye, the plenoptic camera 100 of the present principles includes a second electric motor 22 that reciprocates moves the image sensor 12 parallel to the micro-lens array 18, thus effectively jiggling the image sensor back and forth in a direction orthogonal to movement of the micro-lens array. In practice, the displacement of the micro-lens array 18 is synchronized to the frame capture mechanism (not shown) of the plenoptic camera 100 so a displacement of one pixel results in displacement of the underlying image projected onto the image sensor 12 from the micro-lens array 18 by one pixel. This second image contains exactly the same information as the image captured when the micro-lens grid resided in its prior position, but the Bayer color pattern now changes to yield the complementary colors. If this displacement occurs relatively fast, a patch of consequent frames would contain all the color information of the scene. The task of de-mosaicking then becomes trivial in this case and no pre-processing need occur. The second motor thus serves to further increase the sampling of the color content of the light field. Thus, for example, the plenoptic camera 100 of the present principles can capture a first image at pos0 as depicted in FIG. 4A. Thereafter, the electric motor 22 can displace the image sensor 12 by a one pixel prior to obtaining another image by the image sensor at pos0, but with the different color channel information. The addition of the second electric motor 22 to displace the image sensor 12 increases the color resolution greatly and makes the difficult task of de-mosaicking a much easier one. Implementing this feature reduces the frame rate of the camera to 11 fps.

The foregoing describes a hybrid plenoptic camera with high spatial and angular resolution and improved color resolution.

The invention claimed is:

1. A plenoptic camera having a micro-lens array in optical registration with an image sensor, the micro-lens array being moveable relative to the image sensor, the plenoptic camera comprising; a first prime mover for displacing, in a synchronism manner with a frame rate of the plenoptic camera, the micro-lens array between a first position greater than f, where f represents a focal plane associated with the micro-lens array, and a second position equal to f, to obtain a multi-resolution pyramid of images.

2. The plenoptic camera according to claim 1 further including a second prime mover for displacing the image sensor.

3. The plenoptic camera according to claim 2 wherein the second prime mover comprises an electric motor.

4. The plenoptic camera according to claim 2 wherein the second prime mover displaces the image sensor by a distance such that an image subsequently captured by the image sensor contains identical information as an image captured in its prior position, but with complementary colors, thereby increasing color resolution.

5. The plenoptic camera according to claim 1 wherein the first prime mover comprises an electric motor.

6. The plenoptic camera according to claim 1 wherein the first prime mover displaces the micro-lens array in steps.

7. A method for operating a plenoptic camera having a micro-lens array in optical registration with an image sensor, comprising; displacing, in a synchronism manner with a frame rate of the plenoptic camera, the micro lens array relative to the image sensor via a first prime mover between a first position greater than f, where f represents a focal plane associated with the micro-lens array and a second position equal to f, to obtain a multi-resolution pyramid of images.

8. The method according to claim 7 further including the step of displacing the image sensor via a second prime mover.

9. The method according to claim 8 wherein the second prime mover displaces the image sensor by a distance such that an image subsequently captured by the image sensor contains identical information as an image captured in its prior position, but with complementary colors, thereby increasing color resolution.

10. The method according to claim 7 wherein the first prime mover displaces the micro-lens array in steps.

11. Non-transitory computer-readable medium comprising a computer program recorded thereon and capable of being run by a processor, including program code instructions for implementing a method for operating a plenoptic camera having a micro-lens array in optical registration with an image sensor according to claim 7.

12. Non-transitory computer-readable medium comprising a computer program recorded thereon and capable of being run by a processor, including program code instructions for implementing a method for operating a plenoptic camera having a micro-lens array in optical registration with an image sensor according to claim 8.

13. Non-transitory computer-readable medium comprising a computer program recorded thereon and capable of being run by a processor, including program code instructions for implementing a method for operating a plenoptic camera having a micro-lens array in optical registration with an image sensor according to claim 10.

14. Non-transitory computer-readable medium comprising a computer program recorded thereon and capable of being run by a processor, including program code instructions for implementing a method for operating a plenoptic camera having a micro-lens array in optical registration with an image sensor according to claim 9.

* * * * *